(12) United States Patent
Jiang et al.

(10) Patent No.: US 9,969,286 B2
(45) Date of Patent: May 15, 2018

(54) SMART, INTEGRATED CHARGING DEVICE FOR ELECTRIC VEHICLES

(71) Applicant: SHANDONG LUNENG INTELLIGENCE TECHNOLOGY CO., LTD, Shandong (CN)

(72) Inventors: Bin Jiang, Shandong (CN); Mengchao Fu, Shandong (CN); Juntian He, Shandong (CN); Song Chen, Shandong (CN); Antai Zuo, Shandong (CN); Xiangjun Meng, Shandong (CN); Shiyou Mu, Shandong (CN); Yong Yang, Shandong (CN); Yong Hu, Shandong (CN); Yabo Zhao, Shandong (CN); Hailong Zhang, Shandong (CN); Tao Cao, Shandong (CN)

(73) Assignee: SHANDONG LUNENG INTELLIGENCE TECHNOLOGY CO., LTD, Shandong (CN)

( * ) Notice: Subject to any disclaimer, the term of this patent is extended or adjusted under 35 U.S.C. 154(b) by 142 days.

(21) Appl. No.: 14/915,991

(22) PCT Filed: Oct. 21, 2014

(86) PCT No.: PCT/CN2014/089049
§ 371 (c)(1),
(2) Date: Mar. 2, 2016

(87) PCT Pub. No.: WO2015/039633
PCT Pub. Date: Mar. 26, 2015

(65) Prior Publication Data
US 2016/0193933 A1 Jul. 7, 2016

(30) Foreign Application Priority Data
Sep. 17, 2013 (CN) .......................... 2013 1 0426078

(51) Int. Cl.
H02J 7/00 (2006.01)
B60L 11/18 (2006.01)

(52) U.S. Cl.
CPC ....... B60L 11/1824 (2013.01); B60L 11/1816 (2013.01); B60L 11/1848 (2013.01);
(Continued)

(58) Field of Classification Search
CPC .......... H02J 3/383; H02J 3/00; H02J 13/0006; H02J 13/0079; H02J 3/382; H02J 5/005;
(Continued)

(56) References Cited

U.S. PATENT DOCUMENTS

2010/0134067 A1    6/2010  Baxter et al.
2013/0026991 A1*   1/2013  Roessler ............... H02J 7/0016
                                                          320/116

(Continued)

FOREIGN PATENT DOCUMENTS

CN    101902661    12/2010
CN    202948350    5/2013
(Continued)

OTHER PUBLICATIONS

PCT International Search Report dated Dec. 30, 2014, PCT Patent Application No. PCT/CN2014/089049.
(Continued)

Primary Examiner — Binh Tat
(74) Attorney, Agent, or Firm — Vierra Magen Marcus LLP

(57) ABSTRACT

A smart, integrated charging device for electric vehicles is provided. The alternating current input module is connected to an electricity metering module via an alternating current input switch. The charging module is connected to the electricity metering module via a module alternating current switch and an alternating current bus, and is connected to an
(Continued)

output monitoring module via a direct current bus. The output monitoring module is connected to the monitoring and general control module (13). The direct current output module is connected to the output monitoring module (4) via a direct current output switch. The lightning protection module is connected to the direct current bus. The charging module utilizes smart power combination and multiple output coordination to enable output with current sharing and the automatic balance control technology.

9 Claims, 5 Drawing Sheets

(52) U.S. Cl.
CPC .......... *H02J 7/0027* (2013.01); *H02J 7/0055* (2013.01); *B60L 2230/10* (2013.01); *Y02T 10/7055* (2013.01); *Y02T 90/169* (2013.01); *Y04S 30/14* (2013.01)

(58) Field of Classification Search
CPC .... H02J 7/025; H02J 3/01; H02J 50/10; H02J 17/00; H02J 3/06; H02J 3/12; H02J 3/18; H02J 3/28; H02J 50/12
USPC ................................. 320/106–115
See application file for complete search history.

(56) References Cited

U.S. PATENT DOCUMENTS

| | | | |
|---|---|---|---|
| 2013/0057209 A1 | 3/2013 | Nergaard et al. | |
| 2013/0057214 A1* | 3/2013 | Stevens | B60L 11/1824 320/109 |
| 2014/0210267 A1* | 7/2014 | Ishida | H02J 7/0021 307/31 |

FOREIGN PATENT DOCUMENTS

| | | |
|---|---|---|
| CN | 103208839 | 7/2013 |
| CN | 203119558 | 8/2013 |
| CN | 203119593 U | 8/2013 |
| CN | 103457335 | 12/2013 |
| CN | 203445676 | 2/2014 |
| WO | WO2012007683 A1 | 1/2012 |

OTHER PUBLICATIONS

English Abstract of Chinese Patent Application No. CN101902661.
English Abstract of Chinese Patent Application No. CN103208839.
English Abstract of Chinese Patent Application No. CN103457335.
English Abstract of Chinese Patent Application No. CN202948350.
English Abstract of Chinese Patent Application No. CN203119558.
English Abstract of Chinese Patent Application No. CN203445676.
European Search Report dated Sep. 27, 2017, in European Patent Application No. 14845608.0.

\* cited by examiner

SMART, INTEGRATED CHARGING DEVICE FOR ELECTRIC VEHICLES

This application is a national phase of International Application No. PCT/CN2014/089049, titled "SMART, INTEGRATED CHARGING DEVICE FOR ELECTRIC VEHICLES", filed on Oct. 21, 2014, which claims priority to Chinese Patent Application No. 201310426078.5 titled "SMART INTEGRATED CHARGER DEVICE FOR ELECTRIC AUTOMOBILE" and filed with the Chinese State Intellectual Property Office on Sep. 17, 2013, both of which are incorporated herein by reference in their entirety.

TECHNICAL FIELD

The present disclosure relates to a charger device, and in particular to a smart integrated charger device for an electric vehicle.

BACKGROUND

Research on charging infrastructures has been launched in domestic, involving charging and battery swap two main ways. Charging is limited to large charging station construction, simply combining multiple chargers, and is still at an experiential setting and exploratory stage in setting charging modes and charging parameters for quick charging and normal charging of power batteries of an electric vehicle. Further research on applications such as temperature, insulation, alarm and protection for overcharge of the batteries during charging is needed.

Based on a Chinese patent (Application No. 201220239210.2, titled "Integrated smart charging system") published by the Chinese State Intellectual Property Office on Mar. 20, 2013, and another Chinese patent (Application No. 200910067988.2, titled "Multifunctional integrated charger for electric vehicle having compensation charging function") published by the Chinese State Intellectual Property Office on Aug. 5, 2009, through analysis, there are such technical issues in the published integrated chargers:

1. Conventional chargers communicate with a background through a field bus, which requires laying lots of cables. Interferences may probably be generated in the communications, which may cause a misoperation of the chargers, damaging the chargers and batteries. The cost is high, and laying lots of cables is a waste of human. When a fault occurs, it is difficult to find out the location of the fault because the laid cables are long.

2. No reasonable air channel is provided in a conventional charger, so the temperature of the charger is too high. Components of the charger are prone to be damaged when the temperature of the charger is too high or too low, and the life of the charger is impacted. To prolong the life of the charger, the temperature and humidity in the charger need to be kept in a controllable range. A charging module and a direct current output module are responsible for charging the charger, and a lot of heat is produced during the charging process. If the heat is not vented in time, lives of the charging module and the direct current output module will be affected, and charging efficiency of the charger is also influenced.

3. In conventional technology, integrated chargers and charging poles for electric vehicles are separated, and no system or method for monitoring an integrated charger are provided. A conventional monitoring system can acquire data from only one power output port of the charger, rather than acquire data from multiple power output ports, not to mention processing data of the multiple power output ports.

4. A charging station need to be constructed for a conventional charging pole for an electric vehicle, and there are more electric vehicles currently. It is required to build multiple charging stations in a city to meet the demands. However, charging stations cover large areas, require specific places, and cannot move in response to human's need. So people have a lot of trouble in charging the electric vehicle, and can only charge the electric vehicle at specific places.

5. A conventional integrated charger is readily explosive after running for some time in bad weather, and the explosion of the charger causes great danger to personnel security and an electric vehicle being charged, which wastes cost and causes a lot of damage to state property.

In conclusion, there is no technological means to address the issue mentioned above in the conventional technology so far.

SUMMARY

To address the issue mentioned above, a smart integrated charger for an electric vehicle is provided, and a complete process of charging and billing for the electric vehicle may be achieved.

In view of this, the following technical solution is provided in the disclosure.

A smart integrated charger device for an electric vehicle is provided. The device includes a charger body with constant temperature and constant humidity, where the charger body includes an upper layer and a lower layer, the upper layer of the charger body includes an alternating current input module, a direct current output module, a lightning protection device, and a general control monitoring module of the charger, and the lower layer of the charger body includes charging modules.

The alternating current input module is connected to a power distribution system through a power line and is configured to provide power to the charger, and the alternating current input module is further connected to a power meter module through an alternating current input switch.

The charging modules are connected to the power meter module through a module alternating current switch and an alternating current bus in sequence, and connected to an output monitoring module through a direct current bus, where the output monitoring module is further connected to the general control monitoring module.

The direct current output module is connected to the output monitoring module through a direct current output switch.

The lightning protection device is connected to the alternating current bus.

The charging modules adopt smart power distribution and multiple output coordination to realize a current-sharing output and automatic balancing control.

The charging modules include a plurality of parallel single-phase modules, the plurality of single-phase modules are connected to the output monitoring module, and the plurality of single-phase modules communicate with each other.

The plurality of single-phase modules each includes a pre-stage bridgeless APFC circuit and a LLC converter, both of which are connected to a controller to realize respective close-loop feedback control; the pre-stage bridgeless APFC circuit and the LLC converter provide power to themselves through an auxiliary power supply, and the pre-stage bridgeless APFC circuit is connected to the LLC converter.

The controllers are DSP controllers, and the DSP controllers of the plurality of single-phase modules communicate with each other through CAN.

The output monitoring module communicates with the DSP controllers through 485, and communicates with the general control monitoring module through CAN.

A thermal insulating layer is provided between the upper layer and the lower layer of the charger body, the charging modules are aligned side-to-side, an air duct is provided between each two charging modules, a plurality of filter screens and fans are provided at a side of the lower layer of the charger body, an exhaust fan and an air outlet are provided at another side of the lower layer of the charger body, filter screens and fans are also provided at a side of the upper layer of the charger body, and an exhaust fan and an air outlet are provided at another side of the upper layer of the charger body, a temperature detection module, a humidity detection module, a heating module, a cooling module, a humidification module, a drying module and a wind speed adjustment device are provided in the air duct, and the temperature detection module, the humidity detection module, the heating module, the cooling module, the humidification module, the drying module and the wind speed adjustment device are connected to a microprocessor.

The general control monitoring module communicates with an upper computer through broadband carrier, Ethernet, CAN or other communication means, monitors performance parameters of the charger at any time, and sends an adjustment command based on the performance parameters of the charger at any time.

The general control monitoring module includes a core-board, the core-board is connected to an FPGA expansion board through a board-to-board connector, the board-to-board connector is further connected to a USB interface, a color liquid crystal screen interface, a RS232/RS485 interface, a CAN interface and an Ethernet interface, and the color liquid crystal screen interface is connected to a display module.

The general control monitoring module communicates with an upper computer through broadband carrier, Ethernet, CAN, RS485, or GRPS.

The general control monitoring module is further connected to a card reader, a switch output control module, a switch input acquisition module, a display module, an analogue acquisition module, a charging control module, an electric meter, and an on-board battery management system.

The switch output control module includes a switch output relay, the switch output relay is connected to a central processing unit through an optically coupled isolator, and the central processing unit is connected to a 485 communication interface and a power supply.

The switch input acquisition module includes a switching value input signal acquisition module, the switching value input signal acquisition module is connected to a central processing unit through an optically coupled isolator, and the central processing unit is connected to a 485 communication interface and a power supply.

The display module includes a liquid crystal display, a keyboard, and a digital display.

The power meter module measures power through a current transformer.

A cooling fin is provided on the charging module.

The smart power distribution and the multiple output coordination control are as follows. The charger has a plurality of charging interfaces to charge a plurality of vehicles simultaneously. When the general control monitoring module detects that the charger charges a plurality of electric vehicles simultaneously, the output monitoring module monitors power of each of the electric vehicles, and uploads charging power, voltage and current required by each of the electric vehicles to the general control monitoring module. The general control monitoring module distributes suitable charging modules and number of required charging modules for each of the plurality of charging interfaces, based on voltage and current required by each of the electric vehicles, a maximum output voltage and current of the charger at the moment, and an actual power requirement, and sends a command to a charging control module. The charging control module controls relevant charging modules to start working.

If the general control monitoring module receives a failure alarm signal from a charging module, and after analysis and processing, it is determined a failed charging module needs to be stopped, the general control monitoring module sends a command to the charging control module. The charging control module stops the failed charging module from charging, and increases output power of other charging modules to achieve a normal charging operation.

If the output monitoring module detects that a maximum output provided by the direct current output module cannot satisfy a requirement, the general control monitoring module sends a command to the charging control module to provide a new standby charging module which is able to be started, and the charging control module starts the standby charging module; if a minimum power outputted by the direct current output module is larger than required power, the general control monitoring module sends a control command to the charging control module to stop a redundant charging module, and the charging control module controls to stop the redundant charging module from charging to have each of the charging modules operating at a highest efficiency; if power outputted by the direct current output module is not equal to the required power, the output power is dynamically adjusted in real time.

The operating method of the disclosure is as follows. The general control monitoring module communicates with the upper computer through the broadband carrier, detects performance parameters of the charger at any time. The upper computer sends commands based on the performance parameters of the charger, to control the charger at the best state at all time. The charging modules are connected to the power distribution system, and the obtained alternating current is converted into the direct current through the built-in inverter of the charging module. The direct current passes through the direct current bus and the output monitoring module and reaches the direct current output module. The direct current output module is connected to a rechargeable battery of the electric vehicle, and the charging of electric vehicle is achieved. The charging modules adopt multiple output coordination and smart power distribution to realize a current-sharing output and automatic balancing control. The damage to the battery of the electric vehicle is reduced, the size of the charging module is small and the power of the charging module is high, thereby accomplishing quick charging for the electric vehicle. The air duct, and the temperature and humidity control device are provided in the integrated charger of the disclosure, and the temperature and humidity in the charger body are kept within an allowable range based on data acquired by a temperature sensor and a humidity sensor.

Beneficial effects of the disclosure are as follows.

1. Design for an integrated charger is achieved in the disclosure. Land is saved, and the charger may be provided at any place convenient for people to charge, and may be moved arbitrarily, which facilitates the charging of users.

2. The broadband carrier is used for communicating with the upper computer, data security and accuracy are achieved, and various operations of the upper computer may be controlled exactly.

3. The charging module adopts multiple output coordination and smart power distribution to realize a current-sharing output and automatic balancing control. The damage to the battery of the electric vehicle is reduced, the size of the charging module is small and the power of the charging module is high, thereby accomplishing quick charging for the electric vehicle and improving the efficiency. The issue that the charger is easy to explode is addressed through a voltage and current double loop soft resonance structure of the charging module.

4. A specific air duct is provided in the integrated charger, so that the temperature and humidity in the charger body are kept within an allowable range. A specific air duct is provided between the charging modules in the charger body, so that the size of the charger body is reduced, and the temperature and humidity in the charger body are controllable.

1. alternating current input module, 2. power meter module, 3. charging module, 4. output monitoring module, 5. direct current output module, 6. lightning protection module, 7. alternating current input switch, 8. module alternating current switch 9. direct current bus, 10. direct current output switch, 11. upper computer, 12. electric meter, 13. general control monitoring module, 14. on-board battery management system, 15. charging control module, 16. analogue acquisition module, 17. display module, 18. switch input acquisition module, 19. switch output control module. 20. card reader, 21. charging control module, 22. filter screen, 23. inverter, 24. cable, 25. air outlet, 26. auxiliary power supply, 27. bridgeless APFC circuit, 28. LLC converter, 29. DSP controller, 30. electric vehicle

DETAILED DESCRIPTION

To make objectives, features, and merits of the invention more obvious, embodiments are described in detail in conjunction with drawings.

The invention is illustrated in conjunction with the drawings and embodiments.

Figure 1:
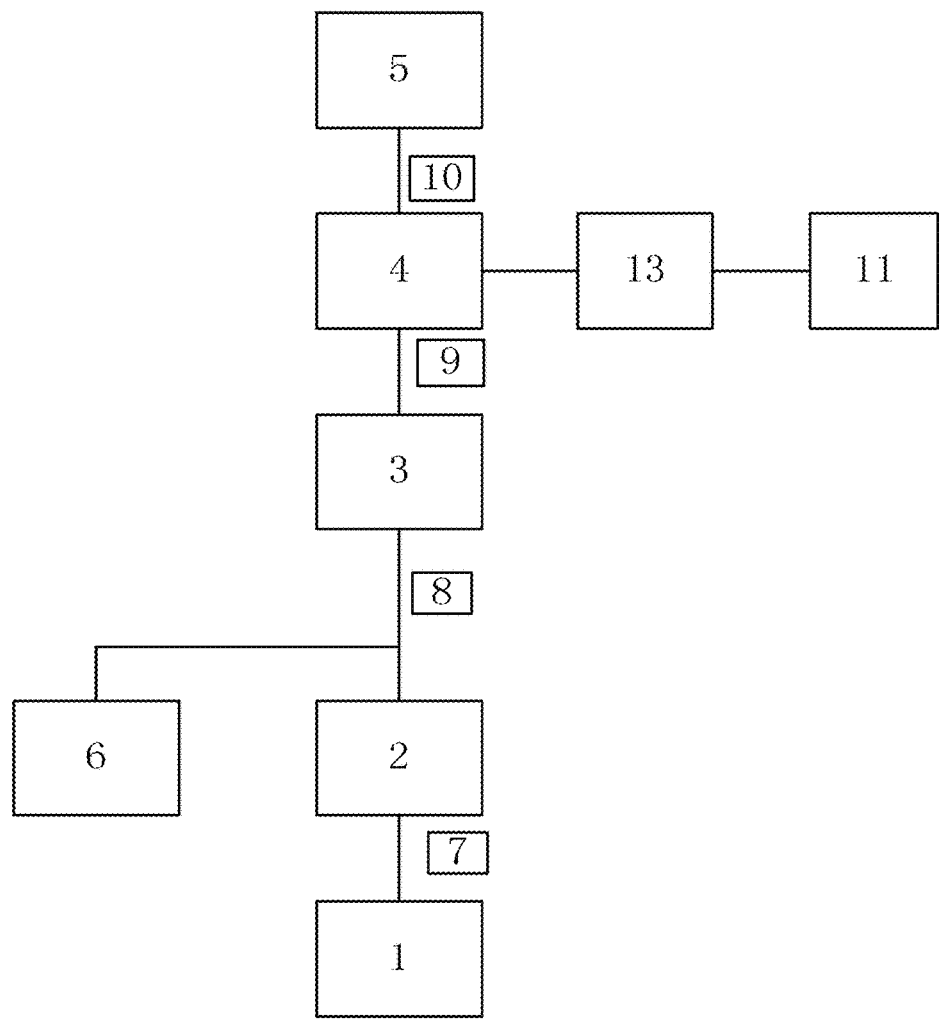
FIG. 1 is a system block diagram of the disclosure.

Referring to FIG. 1, a diagram of a smart integrated charger device for an electric vehicle provided in the disclosure is shown.

The smart integrated charger device for the electric vehicle provided in the embodiment includes a charger body with constant temperature and constant humidity. The charger body includes:

an alternating current input module 1, connected to a power distribution system through a power line to provide power to the charger, and further connected to the power meter module 2 through the alternating current input switch 7;

a charging module 3, connected to the power meter module 2 through the module alternating current switch 8 and an alternating current bus, connected to an output monitoring module 4 through a direct current bus 9, and further connected to a general control monitoring module 13;

a direct current output module 5, connected to the output monitoring module 4 through a direct current output switch 10;

a lightning protection device 6, connected to the alternating current bus.

The power meter module 2 measure power through a current transformer.

A cooling fin is provided on the charging module 3.

The charging module 3 can realize current-sharing output and automatic balancing control through smart power distribution and multiple output coordination.

Figure 4:
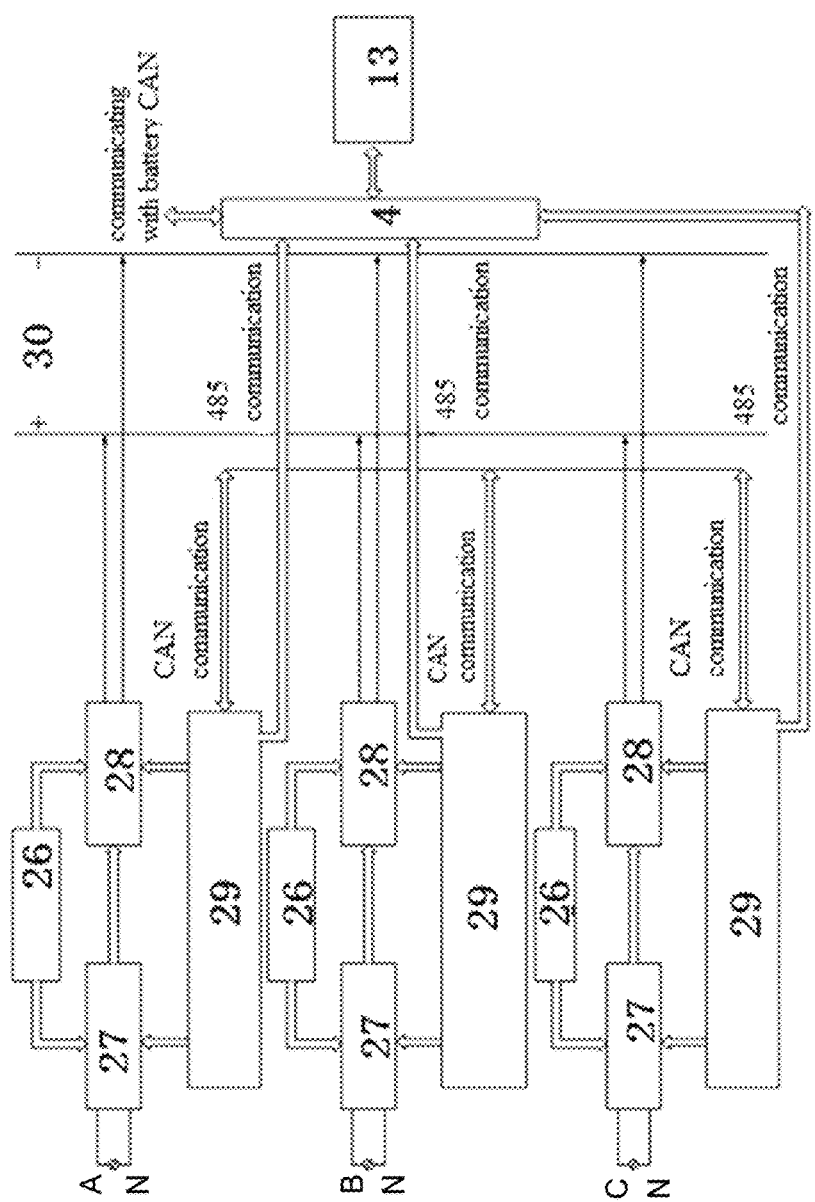
FIG. 4 is a structural diagram of the charging module of the disclosure.

As shown in FIG. 4, the charging module 3 includes multiple parallel single-phase modules, the single-phase modules are connected to the output monitoring module 4, and the single-phase modules communicate with each other.

The single-phase modules each include a pre-stage bridgeless APFC circuit 27 and a LLC converter 28, both of which are connected to a controller to realize close-loop feedback control respectively. The pre-stage bridgeless APFC circuits 27 and LLC converters 28 provide power to themselves through auxiliary power supplies 26, and the pre-stage bridgeless APFC circuits 27 are connected to the LLC converters 28.

The controllers are DSP controllers 29, the DSP controllers 29 of the single-phase modules communicate with each other through CAN.

The output monitoring module 4 communicates with the DSP controllers 29 through 485, and communicates with the general control monitoring module 13 through CAN.

The LLC converters 28 communicate with an electric vehicle 30.

The general control monitoring module 13 includes a core-board. The core-board is connected to a FPGA expansion board through a board-to-board connector, the board-to-board connector is further connected to a USB interface, a color liquid crystal screen interface, a RS232/RS485 interface, a CAN interface and an Ethernet interface, and the color liquid crystal screen interface is connected to a display module.

Figure 2:
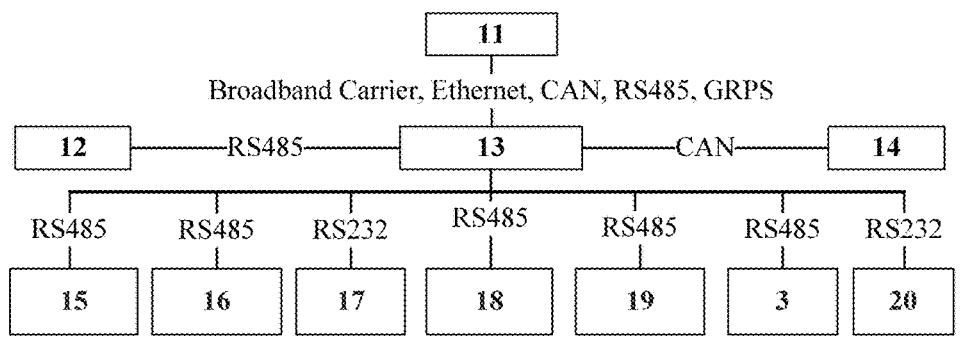
FIG. 2 is a communication block diagram of the disclosure.

As shown in FIG. 2, the general control monitoring module 13 communicates with an upper computer 11 through broadband carrier, Ethernet, CAN, RS485, or GRPS. The general control monitoring module 13 is further connected to a card reader 20, a switch output control module 19, a switch input acquisition module 18, a display module 17, an analogue acquisition module 16, a charging control module 15, an electric meter 12, and an on-board battery management system 14.

The switch output control module 19 includes a switch output relay. The switch output relay is connected to a central processing unit through an optically coupled isolator, and the central processing unit is connected to the 485 communication interface and a power supply.

The switch input acquisition module 18 includes a switching value input signal acquisition module. The switching value input signal acquisition module is connected to a central processing unit through an optically coupled isolator, and the central processing unit is connected to the 485 communication interface and a power supply.

The display module 17 includes a liquid crystal display, a keyboard, and a digital display.

The charging control module 15 regulates limit values of voltage and current outputted by the charger through an analogue output.

The analogue acquisition module 16 acquires a three-phase alternating current input voltage, a direct current output voltage, and a direct current output current.

The switch input acquisition module 18 acquires a total input switch state, a total output switch state, connection acknowledgement, a sudden stop switch state, and a lightning protection switch state.

The output of the switch output control module 19 controls the opening and closure of the direct current output switch and the lighting of a night lamp.

The charging module 3 adopts a multiple output coordination control technique and an smart power distribution technique to realize a current-sharing output and automatic balancing control for the charging module.

The electric meter 12 is used to measure the power and display the measurement.

Figure 3:
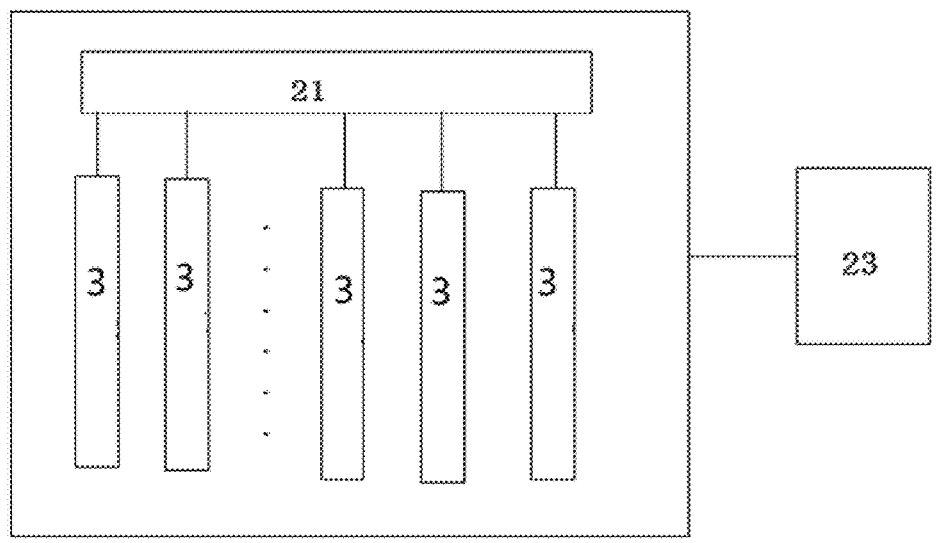
FIG. 3 is a diagram of a control system for a charging module of the disclosure.

As shown in FIG. 3, an input end of each charging module 3 is connected to the alternating current bus, and the other end, i.e., an output end, is connected to an inverter 23. The inverter 23 is connected to the direct current bus 9. The charging modules 3 realize current-sharing output and automatic balancing control through multiple output coordination and smart power distribution. Each charging module 3 is further connected to a charging control module 21.

A cooling fin is provided on the charging module 3.

Figure 5:
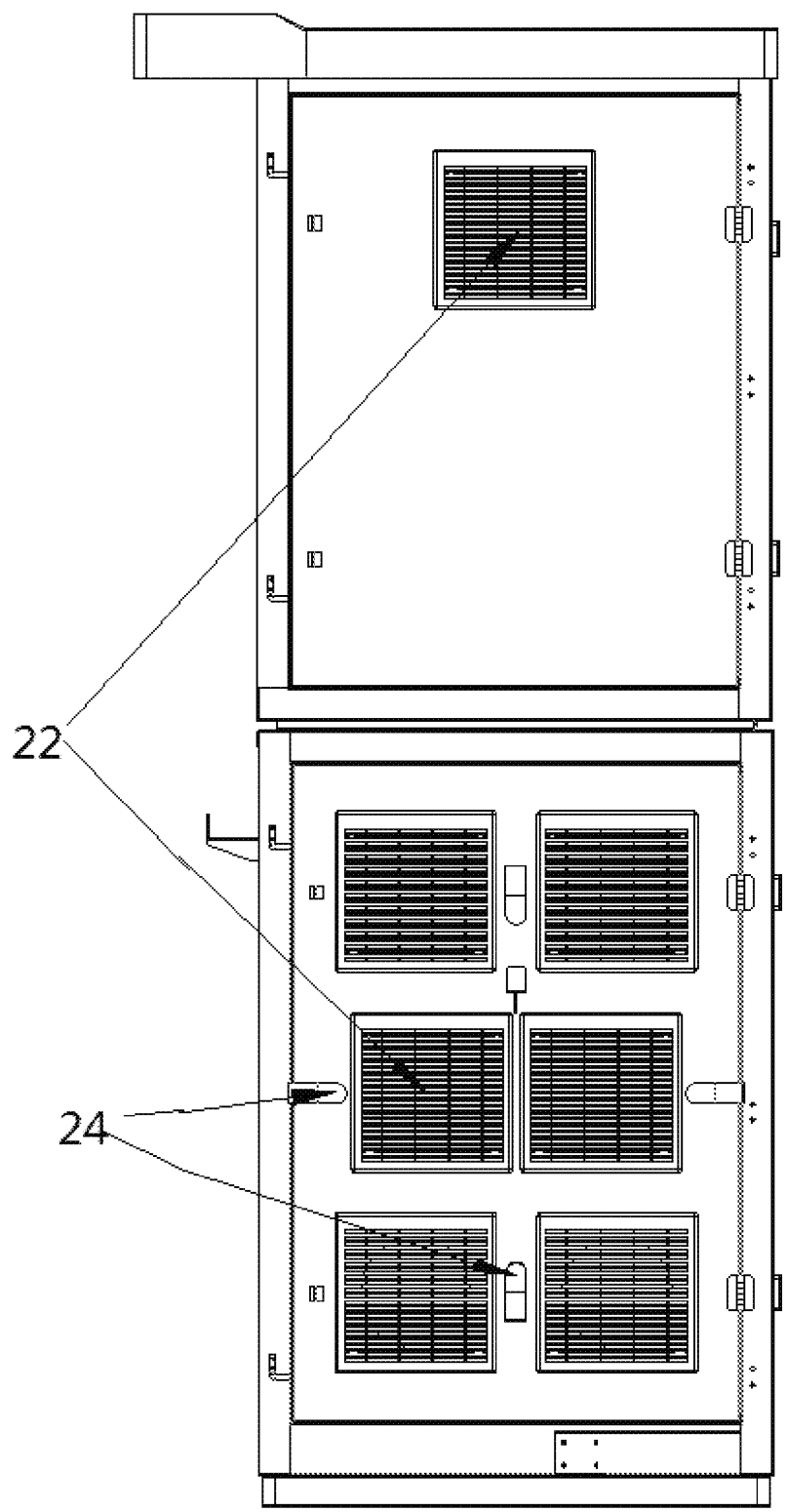
FIG. 5 is a diagram of an air duct of the disclosure.
Figure 5A:
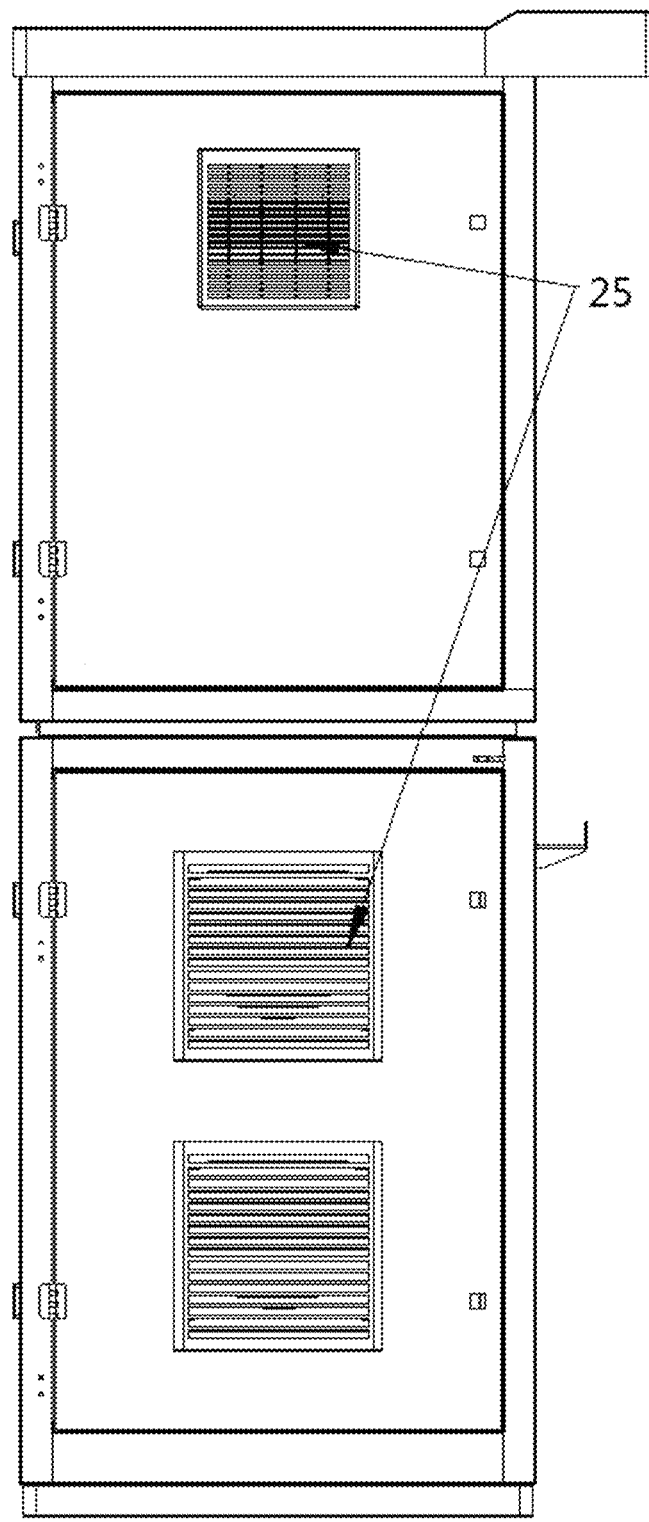
FIG. 5a is a side view of the air duct of the disclosure.

As shown in FIG. 5 and FIG. 5*a*, the charger body includes an upper layer and a lower layer. The upper layer of the charger body includes an alternating current input module 1, a direct current output module 5, a lightning protection module 6, and a general control monitoring module 13. The lower layer of the charger body includes charging modules 3. A thermal insulating layer is provided between the upper layer and the lower layer of the charger body. The charging modules 3 are aligned side-to-side, and an air duct is provided between each two charging modules 3. Multiple filter screens 22 and fans are provided at a side of the lower layer of the charger body, and exhaust fans and air outlets 25 are provided at another side. Filter screens and fans are also provided at a side of the upper layer of the charger body, and exhaust fans and air outlets are provided at another side. The filter screens 22 are self-cleaning filter screens, and a temperature detection module, a humidity detection module, a heating module, a cooling module, a humidification module, a drying module and a wind speed adjustment device are provided in each of the air ducts. The temperature detection module, the humidity detection module, the heating module, the cooling module, the humidification module, the drying module and the wind speed adjustment device are connected to a microprocessor, and the microprocessor is a single chip microcomputer.

If the temperature detection module in the air duct detects the wind from the outside and the temperature is lower/higher than a preset value, the controller of the microprocessor controls to turn on the heating module/the cooling module and turn on the wind speed adjustment device simultaneously, to reduce the wind speed in the air duct so as to maintain constant temperature and constant humidity of the charger body. If the humidity detection module in the air duct detects the wind from the outside and the humidity is lower/higher than a preset value, the microprocessor controls to turn on the drying module/the humidification module and turn on the wind speed adjustment device simultaneously, to reduce the wind speed in the air duct so as to maintain constant temperature and constant humidity of the charger body. If the temperature and humidity of the wind from the outside are both within a set range, the microprocessor turns off the heating module, the cooling module, the humidification module, and the drying module, and turns on the wind speed adjustment device simultaneously, to increase the wind speed in the air duct so as to increase the air convection in the charger body.

The smart power distribution and the multiple output coordination control are as follows. The charger has multiple charging interfaces to charge multiple vehicles simultaneously. When the general control monitoring module 13 detects that the charger charges multiple electric vehicles simultaneously, the output monitoring module 4 monitors the power of each of the electric vehicles, and uploads charging power, voltage and current required by each of the electric vehicles to the general control monitoring module 13. The general control monitoring module 13 distributes suitable charging modules 3 and the number of used charging modules 3 for each of the charging interfaces, based on voltage and current required by each of the electric vehicles, the maximum output voltage and current of the charger at the moment, and an actual power requirement. The general control monitoring module 13 sends a command to the charging control module 21, and the charging control module 21 controls relevant charging modules 3 to start working.

If the general control monitoring module 13 receives a failure alarm signal from a charging module 3, and after analysis and processing, it is determined the failed charging module 3 needs to be stopped, the general control monitoring module 13 sends a command to the charging control module 21, and the charging control module 21 stops the failed charging module 3 from charging and increases output power of other charging modules 3 to achieve a normal charging operation.

If the output monitoring module 4 detects that the maximum output provided by the direct current output module 5 cannot satisfy the requirement, the general control monitoring module 13 sends a command to the charging control module 21 to provide a new standby charging module 3 which may be started, and the charging control module 21 starts the standby charging module 3. If the minimum power outputted by the direct current output module 5 is larger than required power, the general control monitoring module 13 sends a control command to the charging control module 21 to stop a redundant charging module 3, and the charging control module 21 controls to stop the redundant charging module 3 from charging to have each charging module 3 operating at the highest efficiency. If the power outputted by the direct current output module 5 is not equal to the required power, the output power is dynamically adjusted in real time.

The operating method of the disclosure is as follows. The general control monitoring module 13 of the disclosure communicates with the upper computer 11 through the broadband carrier, detects performance parameters of the charger at any time. The general control monitoring module 13 sends commands, based on the performance parameters of the charger, to control the charger at the best state at all time. The charging modules 3 are connected to the power distribution system, and the obtained alternating current is converted into the direct current through the built-in inverter 23 of the charging module 3. The direct current passes through the direct current bus 9 and the output monitoring module 4 and reaches the direct current output module 5. The direct current output module 5 is connected to a rechargeable battery of the electric vehicle, and the charging of electric vehicle is achieved. The charging modules 3 adopt multiple output coordination and smart power distribution to realize a current-sharing output and automatic balancing control. The damage to the battery of the electric vehicle is reduced, the size of the charging modules is small and the power of the charging modules is high, thereby accomplishing quick charging for the electric vehicle and improving the efficiency. The air duct and the temperature and humidity control device are provided in the integrated charger of the disclosure, and the temperature and humidity in the charger body are controllable based on data acquired by a temperature and humidity sensor.

The description mentioned above is just preferable embodiments of the disclosure, and are not to limit the disclosure in any form. Though the disclosure is illustrated as above with preferable embodiments, the disclosure is not limited thereto. Those skilled in the art may make many possible changes and modifications to the technical solution of the disclosure, or revise into equivalent embodiments with equivalent changes, based on the method and technical content mentioned above without departing from the scope of the technical solution of the disclosure. Thus, any simple change, equivalent substitution or modification made to the embodiments based on the technical essence without departing from the technical solution of the disclosure fall within the technical protection scope of the disclosure.

The invention claimed is:

1. A smart integrated charger device for an electric vehicle, comprising a charger body with constant temperature and constant humidity, wherein the charger body includes an upper layer and a lower layer, the upper layer of the charger body includes an alternating current input module, a direct current output module, a lightning protection device, and a general control monitoring module of the charger, and the lower layer of the charger body includes charging modules, and wherein:

the alternating current input module is connected to a power distribution system through a power line and is configured to provide power to the charger, and the alternating current input module is further connected to a power meter module through an alternating current input switch;

the charging modules are connected to the power meter module through a module alternating current switch and an alternating current bus in sequence, and connected to an output monitoring module through a direct current bus, wherein the output monitoring module is further connected to the general control monitoring module;

the direct current output module is connected to the output monitoring module through a direct current output switch;

the lightning protection device is connected to the alternating current bus; and the charging modules adopt smart power distribution and multiple output coordination to realize a current-sharing output and automatic balancing control;

the charging modules comprise a plurality of parallel single-phase modules, the plurality of single-phase modules are connected to the output monitoring module, and the plurality of single-phase modules communicate with each other;

the plurality of single-phase modules each comprise a pre-stage bridgeless APFC circuit and a LLC converter, both of which are connected to a controller to realize respective close-loop feedback control, the pre-stage bridgeless APFC circuit and the LLC converter provide power to themselves through an auxiliary power supply, and the pre-stage bridgeless APFC circuit is connected to the LLC converter;

the controllers are DSP controllers, and the DSP controllers of the plurality of single-phase modules communicate with each other through CAN; and the output monitoring module communicates with the DSP controllers through 485, and communicates with the general control monitoring module through CAN.

2. The smart integrated charger device for an electric vehicle according to claim 1, wherein a thermal insulating layer is provided between the upper layer and the lower layer of the charger body, the charging modules are aligned side-to-side, an air duct is provided between each two charging modules, a plurality of filter screens and fans are provided at a side of the lower layer of the charger body, an exhaust fan and an air outlet are provided at another side of the lower layer of the charger body, filter screens and fans are also provided at a side of the upper layer of the charger body, and an exhaust fan and an air outlet are provided at another side of the upper layer of the charger body, a temperature detection module, a humidity detection module, a heating module, a cooling module, a humidification module, a drying module and a wind speed adjustment device are provided in the air duct, and the temperature detection module, the humidity detection module, the heating module, the cooling module, the humidification module, the drying module and the wind speed adjustment device are connected to a microprocessor.

3. The smart integrated charger device for an electric vehicle according to claim 1, wherein the general control monitoring module communicates with an upper computer, monitors performance parameters of the charger at any time, and sends an adjustment command based on the performance parameters of the charger at any time.

4. The smart integrated charger device for an electric vehicle according to claim 1, wherein the general control monitoring module comprises a core-board, the core-board is connected to an FPGA expansion board through a board-to-board connector, the board-to-board connector is further connected to a USB interface, a color liquid crystal screen interface, a RS232/RS485 interface, a CAN interface and an Ethernet interface, and the color liquid crystal screen interface is connected to a display module.

5. The smart integrated charger device for an electric vehicle according to claim 3, wherein the general control monitoring module communicates with an upper computer through broadband carrier, Ethernet, CAN, RS485, or GRPS.

6. The smart integrated charger device for an electric vehicle according to claim 1, wherein the general control monitoring module is further connected to a card reader, a switch output control module, a switch input acquisition module, a display module, an analogue acquisition module, a charging control module, an electric meter, and an on-board battery management system.

7. The smart integrated charger device for an electric vehicle according to claim 6, wherein the switch output control module comprises a switch output relay, the switch output relay is connected to a central processing unit through an optically coupled isolator, and the central processing unit is connected to a 485 communication interface and a power supply;

the switch input acquisition module comprises a switching value input signal acquisition module, the switching value input signal acquisition module is connected to a central processing unit through an optically coupled isolator, and the central processing unit is connected to a 485 communication interface and a power supply;

the display module comprises a liquid crystal display, a keyboard, and a digital display; and the power meter module measures power through a current transformer.

8. The smart integrated charger device for an electric vehicle according to claim 1, wherein the smart power distribution and the multiple output coordination control are as follows:

the charger has a plurality of charging interfaces to charge a plurality of vehicles simultaneously; when the general control monitoring module detects that the charger charges a plurality of electric vehicles simultaneously, the output monitoring module monitors power of each of the electric vehicles, and uploads charging power, voltage and current required by each of the electric vehicles to the general control monitoring module, the general control monitoring module distributes suitable charging modules and number of required charging modules for each of the plurality of charging interfaces, based on voltage and current required by each of the electric vehicles, a maximum output voltage and current of the charger at the moment, and an actual power requirement, and sends a command to a charging control module, and the charging control module controls number of used charging modules and relevant charging modules to start working;

if the general control monitoring module receives a failure alarm signal from a charging module, and after analysis and processing, it is determined a failed charging module needs to be stopped, the general control monitoring module sends a command to the charging control module, and the charging control module stops the failed charging module from charging, and increases output power of other charging modules to achieve a normal charging operation; and if the output monitoring module detects that a maximum output provided by the direct current output module cannot satisfy a requirement, the general control monitoring module sends a command to the charging control module to provide a new standby charging module which is able to be started, and the charging control module starts the standby charging module; if a minimum power outputted by the direct current output module is larger than required power, the general control monitoring module sends a control command to the charging control module to stop a redundant charging module, and the charging control module controls to stop the redundant charging module from charging to have each of the charging modules operating at a highest efficiency; if power outputted by the direct current output module is not equal to the required power, the output power is dynamically adjusted in real time.

9. The smart integrated charger device for an electric vehicle according to claim 1, wherein a cooling fin is provided on the charging modules.

* * * * *